United States Patent [19]

Földi et al.

[11] Patent Number: 4,960,332

[45] Date of Patent: Oct. 2, 1990

[54] APPARATUS FOR GEOMETRICAL TESTING OF SPHERICAL BODIES, IN PARTICULAR STEEL BALLS

[75] Inventors: Tivadar Földi; István Bernàt, both of Budapest; Làszlo Vogronics, Érd, all of Hungary

[73] Assignee: Vertikum Magas-és Mélyépitményjavito Kisszovetkezet, Budapest, Hungary

[21] Appl. No.: 214,481

[22] Filed: Jun. 30, 1988

[30] Foreign Application Priority Data

Jul. 6, 1987 [HU] Hungary .............................. 3033/87

[51] Int. Cl.$^5$ ............................................ G01B 11/30
[52] U.S. Cl. .................................... 356/376; 356/391; 356/237
[58] Field of Search ............... 356/388, 391, 397, 376, 356/237

[56] References Cited

U.S. PATENT DOCUMENTS 3,907,438  9/1975  Holeman .............................. 356/376

FOREIGN PATENT DOCUMENTS 31910   2/1986  Japan ................................... 356/376
667805  6/1979  U.S.S.R. ............................. 356/371

Primary Examiner—F. L. Evans
Attorney, Agent, or Firm—Schweitzer & Cornman

[57] ABSTRACT

An apparatus for the testing of spheres for geometric exactness, which comprises a light source, a projectable image within or outside of said light source, optical means for simultaneously directing light in two different directions wherein one of said directions is onto a sphere to be tested and the other of said directions in onto an imaging means, and means for directing light onto said imaging means either as reflected from the sphere to be tested, or both from the sphere and from the light source without the optical interposition of the sphere.

5 Claims, 2 Drawing Sheets

APPARATUS FOR GEOMETRICAL TESTING OF SPHERICAL BODIES, IN PARTICULAR STEEL BALLS

FIELD OF THE INVENTION

The invention relates to an apparatus for the testing of spheres for geometrical exactness, particularly of balls.

BACKGROUND OF THE INVENTION

Ever increasing demands directed to the quality of ball bearings require that the balls should without exception approach the shape of the theoretical sphere. That means, that diameters measured from any position and of any surface smoothness should comply with these requirement. Any single ball with deviating geometry ball in a given bearing, results in untimely wear. Therefore, most stringent control is required, with maintenance of exact characteristics for the entire group of balls in a bearing.

Of all known methods used for supporting, orienting, and controlling of balls that method is considered the most accurate, in which the ball to be measured is placed on three balls of known diameter, of identical group tolerance, and having the same or different diameter of the ball to be measured, serving as reference standard and arranged in a nest. Then the ball to be measured is touched with a diamond needle led thereto, and the distance between a point on the corresponding standard ball and the diamond needle—corresponding to the diameter of the ball to be measured—is measured by inductivity. The balls with radii or diameters beyond the tolerance limit are separated out.

The disadvantage of this method is that only one signal linear dimension (diameter, or radius) is obtained. This is valid between two preferred points of the given sphere. It can happen, however, that measuring between two other "preferred" points would give different measuring results. Therefore, this type of measurement does not sense an eventual deviation from the spherical shape. It can happen, even if only in a small number of cases, that defective balls are evaluated by this method as being accurately shaped balls.

A further disadvantage of this method is that no information can be gained on the surface smoothness of the balls. Furthermore, the diamond tip that mechanically contacts the balls to be measured has to be replaced after a certain number of measurements, involving considerable cost and effort.

Thus, this type of measurement is more suitable for use in the laboratory rather as a technique routinely used in manufacture.

DESCRIPTION OF THE INVENTION

The aim of our invention is to provide an apparatus for testing of spherical bodies for geometric exactness, in particular steel balls, which is free of the disadvantages mentioned above. The apparatus should enable measurement of a variety of parameters, such as deviation from spherical form and measuring of so-called squareness, without mechanical contact with the ball to be measured.

In accordance with the invention that aim is satisfied by an apparatus, in which in the immediate environment of the base carrying the ball to be tested, expediently above said base, a lens-system is arranged consisting of convex-concave lenses, and a semitransparent mirror is arranged at an angle of 45°, a compensating lens and a screen are all disposed in a first optical axis of the system, and a second optical axis, intersecting said first optical axis, extends from a light source perpendicularly through a Carthausian grid to said semipermeable mirror.

In another embodiment the base or nest carrying the ball to be tested is preferably arranged in an optical system which contains a semipermeable mirror ordered to a laser source. In the plane of the mirror the laser source and the ball to be tested are optically directly interconnected, a lens-system is interposed in a straight line interconnecting the semipermeable mirror with a fully reflecting mirror intersecting each other, and the mirror with the full reflection and the ball are in an optical connection with an image forming screen.

Expediently the image forming screen is connected to a signal transformer connected to a computer. Suitably the apparatus also includes a ball-feeder and a ball delivering and selecting device that are known per se.

The invention is based on the recognition that the smooth, reflecting surface of the ball to be measured can be considered as part of the measuring optical system, or of a system being quasi identical therewith, while the projected formation and that being reflected therefrom yield exact information on the sphericity and surface smoothness of the balls.

DESCRIPTION OF THE DRAWING

The invention is described in detail by means of preferred embodiments thereof, with reference to the accompanying drawings, wherein

As shown in FIG. 1, a lens-system 3 is contained in a casing (not shown), arranged above a ball 8 on a support 16, held by a nest 15 of three supporting balls. The system of lenses projects a sharp, focused image of a Carthausian (quadratic) grid 1 onto the ball surface. The 3 is coupled to a semipermeable mirror 2, which is in optical relation partly with the grid illuminated by a light source 10, a screen 5, and a condenser (zoom) lens 4 arranged along an optical axis I partly in the path of the semipermeable mirror. The light source 10 projects along the axis II the image of the Carthausian grid 1 with the intervention of the semipermeable mirror 2 onto the ball 8 to be tested. The image reflected from the surface of the ball 8 arrives along the axis I to the screen 5. The image appearing on the screen 5 is reflected from a considerably large part of the ball.

We found that in the image formation the most characteristic formations of the ball are incorporated in the image, from which conclusions can be drawn on the sphericity of the ball 8 tested. If the image with spherical aberration shows a distortion in the shape of a cushion or a barrel, that means a plus or minus deviation from the ideal diameter, which —when calibrated in a manner known in itself— yields information on the standard deviation of the diameter of the ball 8.

Further information can be gained on the exactness of processing (smoothness) of the surface of the ball 8 from the image projected onto the screen 5, on basis of the changes in the line thickness and course of the Cartausian grid. Reliable information can be gained by the transformation of the change on the principle of the Gaussian curve.

Since the balls 8 are measured on a production line, it is expedient to process the obtained image on a computer, and the selection of unsuitable rejects or passing of acceptable balls can also be carried out under computer-aided control.

Figure 1:
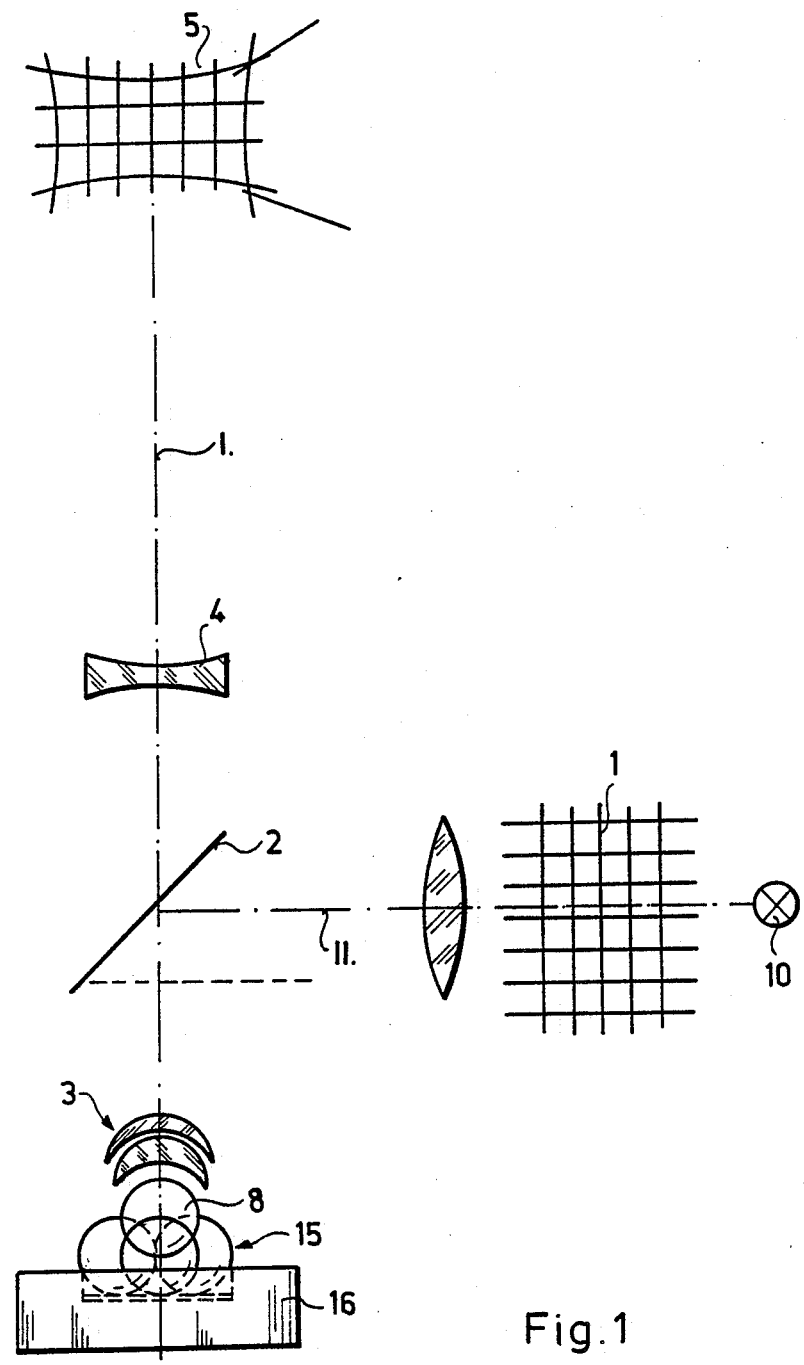
FIG. 1 is a schematic illustration of one embodiment of the apparatus of the invention.
Figure 2:
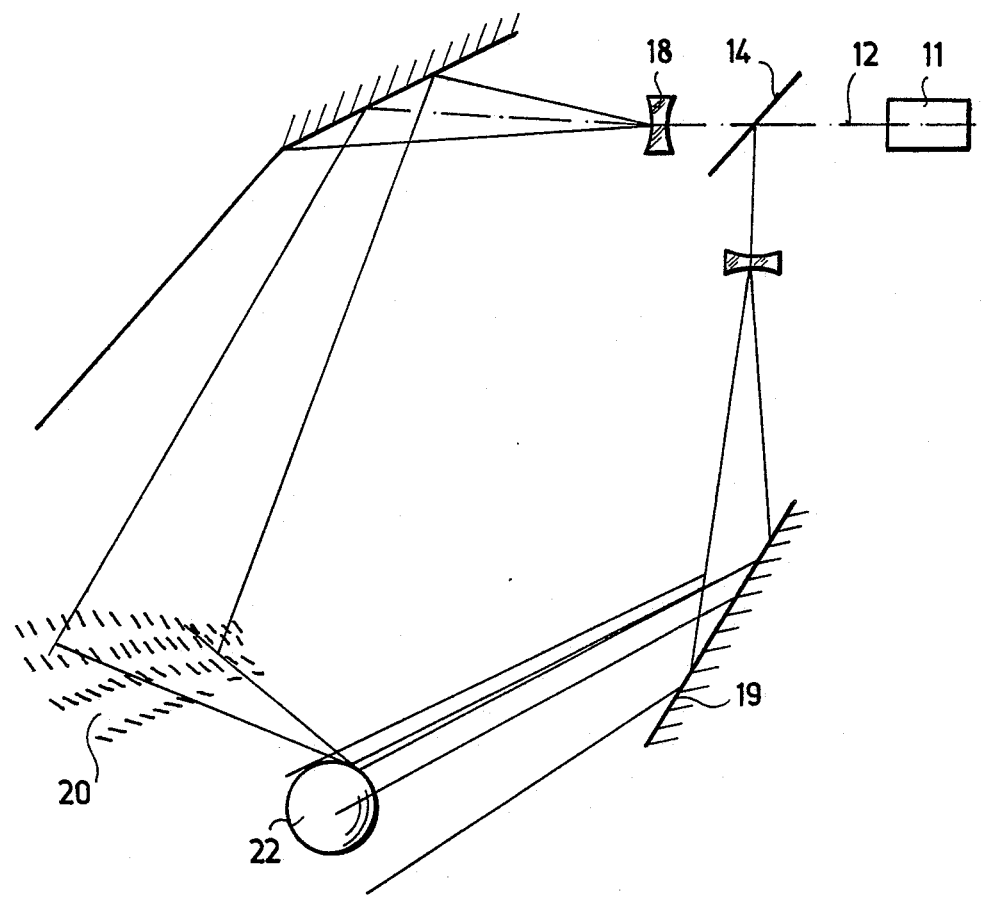
FIG. 2 is a didactic schematic illustration of another embodiment of the apparatus of the invention being actuated with laser beam.

Another embodiment of the invention is shown in FIG. 2, in which a laser ray is used instead of the bundle of ordinary light rays. In this case a ray 12 is emitted from a laser source 11, passes through a semipermeable mirror 14 to screen 20 with the intervention of a system 18 of lenses. The semipermeable 14 also reflects the laser ray at an angle of about 90° past a fully reflecting mirror 19 and ultimately to image forming screen 20. Thus the laser ray simultaneously arrives from two directions, directly from the source 11 and also projects an image from the a ball 22 onto the screen 20.

In this manner the two images that are projected onto each other on the screen 20, are either superimposed or weaken or extinguish on another. Fourier transformation of the extent of any extinction is compared and examined.

In any embodiment of the apparatus according to the invention can be connected to a computer memory in a manner known per se and the apparatus can be provided with any known ball feeding and classifying arrangement.

What we claim:

1. An apparatus for the testing of spheres for geometric exactness, which comprises a light source, a projectable image within or outside of said light source, optical means for simultaneously directing light in two different directions wherein one of said directions is onto a sphere to be tested and the other of said directions is onto an imaging means, and means for directing light onto said imaging means either as reflected from the sphere to be tested, or both from the sphere and from the light source without the optical interposition of the sphere.

2. The apparatus of claim 1, wherein said optical means is a semitransparent mirror.

3. The apparatus of claim 2, wherein said projectable image is a grid having rectangular opening and being disposed in front of said light source, said semitransparent mirror being adapted to direct light bearing the image of said grid onto the surface of the sphere to be tested, means adapted to focus said image onto said surface, said semitransparent mirror being further adapted to direct the image reflected from said sphere to said imaging means.

4. The apparatus of claim 2, wherein said light source is a laser, said semitransparent mirror is adapted to direct a first part of the light output of said laser in a first direction indirectly onto the surface of a sphere to be tested and to direct the second part of said light output in a second direction to said imaging means, the sphere to be tested being adapted to reflect to the imaging means the light arriving indirectly from said first direction.

5. The apparatus of claim 2, further comprising a base for supporting a sphere to be tested, said base including at least three supporting spheres.

* * * * *